US011169925B2

(12) United States Patent
Nakra et al.

(10) Patent No.: US 11,169,925 B2
(45) Date of Patent: Nov. 9, 2021

(54) CAPTURING TEMPORAL STORE STREAMS INTO CPU CACHES BY DYNAMICALLY VARYING STORE STREAMING THRESHOLDS

(71) Applicants: Tarun Nakra, Austin, TX (US); Kevin Lepak, Austin, TX (US)

(72) Inventors: Tarun Nakra, Austin, TX (US); Kevin Lepak, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 1304 days.

(21) Appl. No.: 14/995,180

(22) Filed: Jan. 13, 2016

(65) Prior Publication Data

US 2017/0060754 A1 Mar. 2, 2017

Related U.S. Application Data

(60) Provisional application No. 62/209,877, filed on Aug. 25, 2015.

(51) Int. Cl.
*G06F 12/08* (2016.01)
*G06F 12/0871* (2016.01)

(52) U.S. Cl.
CPC .. *G06F 12/0871* (2013.01); *G06F 2212/1044* (2013.01); *G06F 2212/282* (2013.01); *G06F 2212/608* (2013.01)

(58) Field of Classification Search
None
See application file for complete search history.

(56) References Cited

U.S. PATENT DOCUMENTS

| 5,749,095 A * | 5/1998 | Hagersten | G06F 12/0817 709/245 |
| 6,260,115 B1 * | 7/2001 | Permut | G06F 12/0862 711/133 |
| 6,272,622 B1 * | 8/2001 | Han | G06F 12/0862 711/E12.057 |
| 6,370,622 B1 * | 4/2002 | Chiou | G06F 12/0831 711/119 |
| 6,862,027 B2 * | 3/2005 | Andrews | G06F 15/7846 345/419 |
| 7,392,340 B1 * | 6/2008 | Dang | G06F 12/0871 711/111 |
| 7,669,194 B2 | 2/2010 | Archambault et al. | |
| 8,433,854 B2 | 4/2013 | Tetrick et al. | |
| 8,490,065 B2 | 7/2013 | Archambault et al. | |
| 8,725,947 B2 | 5/2014 | Sood et al. | |

(Continued)

*Primary Examiner* — Ryan Bertram
(74) *Attorney, Agent, or Firm* — Renaissance IP Law Group LLP (57) ABSTRACT

According to one general aspect, an apparatus may include a store stream detector configured to detect when the apparatus is streaming data to a memory system. The apparatus may also include a write generator configured to route a stream of data to either a near memory of the memory system or a far memory of the memory system based upon a cache threshold value and a size of the stream of data. The apparatus may be configured to dynamically vary the cache threshold value based upon a predetermined rule set, such that cache pollution caused by the stream of data is managed.

20 Claims, 5 Drawing Sheets

(56) References Cited

U.S. PATENT DOCUMENTS

| | | | | |
|---|---|---|---|---|
| 8,732,406 B1* | 5/2014 | Pase | G06F 12/0862 | 711/137 |
| 9,665,491 B2* | 5/2017 | Radhakrishnan | G06F 12/0862 | |
| 2003/0105926 A1* | 6/2003 | Rodriguez | G06F 12/0862 | 711/129 |
| 2004/0054860 A1* | 3/2004 | Dixit | G06F 12/0888 | 711/160 |
| 2005/0251630 A1* | 11/2005 | Matthews | G06F 12/126 | 711/138 |
| 2007/0005889 A1* | 1/2007 | Matthews | G06F 12/0888 | 711/118 |
| 2007/0028053 A1* | 2/2007 | Shet | G06F 12/0871 | 711/129 |
| 2008/0005524 A1* | 1/2008 | Worrall | G06F 12/04 | 711/171 |
| 2008/0320235 A1* | 12/2008 | Beckmann | G06F 12/126 | 711/144 |
| 2009/0327607 A1* | 12/2009 | Tetrick | G06F 12/0888 | 711/118 |
| 2009/0327618 A1* | 12/2009 | Pollack | G06F 3/0605 | 711/154 |
| 2010/0005241 A1* | 1/2010 | Kim | G06F 12/128 | 711/122 |
| 2010/0115240 A1* | 5/2010 | Falik | G06F 9/30032 | 712/210 |
| 2010/0186077 A1* | 7/2010 | Chang | G06F 12/0246 | 726/9 |
| 2012/0054448 A1* | 3/2012 | Thompson | G06F 12/0862 | 711/137 |
| 2013/0232320 A1* | 9/2013 | Dale | G06F 12/0862 | 712/27 |
| 2013/0254246 A1* | 9/2013 | Lipcon | G06F 12/0866 | 707/823 |
| 2013/0254485 A1* | 9/2013 | Kannan | G06F 12/0862 | 711/122 |
| 2013/0262780 A1* | 10/2013 | Manne | G06F 12/0804 | 711/142 |
| 2013/0326116 A1* | 12/2013 | Goss | G06F 12/0871 | 711/103 |
| 2015/0220477 A1* | 8/2015 | Bisht | G06F 3/0656 | 710/33 |
| 2015/0356014 A1* | 12/2015 | Sathish | G06F 12/0862 | 711/3 |
| 2016/0019155 A1* | 1/2016 | Radhakrishnan | G06F 12/0862 | 711/137 |
| 2017/0031823 A1* | 2/2017 | Ross | G06F 12/0862 | |

\* cited by examiner

CAPTURING TEMPORAL STORE STREAMS INTO CPU CACHES BY DYNAMICALLY VARYING STORE STREAMING THRESHOLDS

CROSS-REFERENCE TO RELATED APPLICATION

This application claims priority under 35 U.S.C. § 119 to Provisional Patent Application Ser. No. 62/209,877, entitled "CAPTURING TEMPORAL STORE STREAMS INTO CPU CACHES BY DYNAMICALLY VARYING STORE STREAMING THRESHOLDS" filed on Aug. 25, 2015. The subject matter of this earlier filed application is hereby incorporated by reference.

TECHNICAL FIELD

This description relates to the storing of data, and more specifically to the caching or lack thereof of streaming data.

BACKGROUND

Streaming data in the context of a processor (CPU) is generally a sequence of store or write instructions that writes data to consecutive or contiguous memory locations in virtual space. Often a large block of data will be moved or stored to memory via a series of write or store operations. A typical example of a streaming data or "store streaming" is a "Memory Copy", which is a commonly used software routine that copies a block of memory from a source location to a destination location. In hardware, this routine translates to a stream of loads or read operations fetching data from the source location, followed by a stream of stores or write operations that copy the loaded data to the destination location. Some applications may simply utilize store streaming to initialize a large block of memory.

At times, these store streams are non-temporal. That is the data is often referenced only once and then not reused in the immediate future. For example, a typical Memory Copy operation may involve moving several kilobytes or megabytes of data that may only be referenced once during program execution. Caching the store data within the processor's caches (e.g., L2, L1, L3, etc.) can displace other useful cache-resident data, and be detrimental to performance.

Often, to avoid cache pollution, applications may attempt to provide software hints (e.g., through instruction opcodes, memory types, etc.) to let the hardware know that the streamed data is not to be cached. However there may be instances when software hints are not available within the instruction set or employed by the software. To address such concerns, many hardware designs incorporate a mechanism to dynamically detect the pattern of stores, and look for the case of store streaming patterns of large sizes (in order to stream them directly to system memory).

Using the above approach of hardware store streaming detection tends to avoid the general problem of cache pollution. However some applications (e.g., compilers, etc.) tend to temporally re-access store streams of reasonably large sizes that would otherwise fit within Level 2 (L2) or Level 3 (L3) caches. For those applications, caching would have been more beneficial. However, using the traditional hardware detection approach, those store streams would be written to memory repeatedly, incurring system memory bandwidth and power usage, and foregoing the benefits of cache storage.

SUMMARY

According to one general aspect, an apparatus may include a store stream detector configured to detect when the apparatus is streaming data to a memory system. The apparatus may also include a write generator configured to route a stream of data to either a near memory of the memory system or a far memory of the memory system based upon a cache threshold value and a size of the stream of data. The apparatus may be configured to dynamically vary the cache threshold value based upon a predetermined rule set, such that cache pollution caused by the stream of data is managed.

According to another general aspect, a method may include detecting a stream of data to be written to a memory system. The method may include, when a size of the stream of data exceeds a cache threshold value, writing the stream of data to either a near memory of the memory system or a far memory of the memory system based upon the cache threshold value. The method may include dynamically varying the cache threshold value based upon a predetermined rule set, such that cache pollution caused by the stream of data is managed.

According to another general aspect, a system-on-a-chip may include a memory system and a processor. The memory system may include a near memory configured to store data, and a far memory configured to store data, wherein the far memory is slower and larger than the near memory. The processor may include a store stream detector configured to detect when a stream of data is being written to the memory system, and a write generator configured to route the stream of data to either the near memory or the far memory based upon a cache threshold value and a size of the stream of dat. The processor may be configured to dynamically vary the cache threshold value based upon a predetermined rule set, such that cache pollution caused by the stream of data is managed.

The details of one or more implementations are set forth in the accompanying drawings and the description below. Other features will be apparent from the description and drawings, and from the claims.

A system and/or method for the storing of data, and more specifically to the caching or lack thereof of streaming data, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
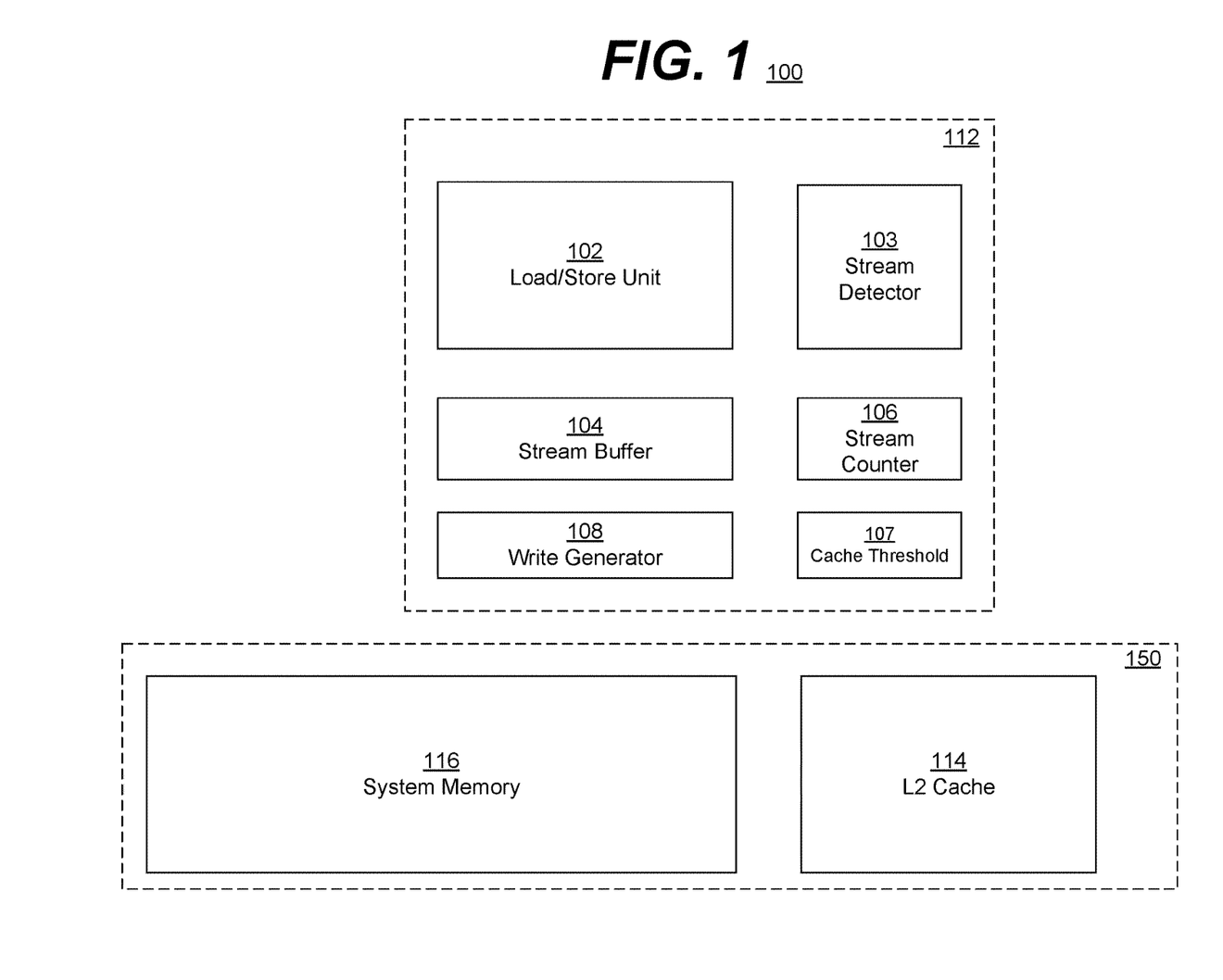
FIG. 1 is a block diagram of an example embodiment of a system in accordance with the disclosed subject matter.

FIG. 1 is a block diagram of an example embodiment of a system 100 in accordance with the disclosed subject matter. In the illustrated embodiment, the system 100 may include a computing device, such as, for example, a laptop, desktop, workstation, personal digital assistant, smartphone, tablet, and other appropriate computers.

In various embodiments, the system 100 may include a processor or CPU 112 configured to execute various instructions or perform operations. Further, the system 100 may also include a memory system 150. In the illustrated embodiment, the memory system 150 may include a system memory 116 (e.g., dynamic random access memory (DRAM), NAND memory, etc.) and a Level 2 (L2) cache 114. In various embodiments, the memory system may include a Level 1 cache which is not shown.

In various embodiments, the memory system 150 may include a plurality of tiers of memory storage. As is understood by one skilled in the art, the tiers of a memory systems generally attempt to balance speed with size. Tiers that are topologically closer or nearer to the processor 112 are often faster but smaller than tiers that are further away (topologically) from the processor 112. For example, an L1 cache may be the closest, smallest, and faster tier of the memory system. The L2 cache 114 may be the midway in distance from the processor 112, smaller than the system memory 116 but larger than the L1 cache, and faster than the system memory 116 but slower than the L1 cache. Finally, the system memory 116 may be the tier furthest away from the processor 112, slowest, but largest of all the tiers. It is understood that the above are merely a few illustrative examples to which the disclosed subject matter is not limited.

As described above, when the size of a memory tier is limited, the choice of what to store in that tier becomes an issue. If there is a large amount to data to be stored, it is possible for the large data to crowd out other data. The cache or memory tier may effectively become monopolized (or dominated) by the large data set. If the data set will be reused, this domination of the cache may not be a problem. The data may be accessed more quickly by being in the cache. Conversely, if the data set will not be reused or used minimally, this domination of the cache can cause the cache to effectively be useless or counter-productive, as it is filled with unwanted data. In such a case, this domination is referred to as "cache pollution". It is desirable to avoid cache pollution.

In the illustrated embodiment, the processor 112 may include a load/store unit (LSU) 102 configured to issue load (read) or store (write) operations. In the illustrated embodiment, store operations will be discussed. However, an embodiment may be created that focuses upon or considers load operations. It is understood that the above is merely one illustrative example to which the disclosed subject matter is not limited.

In the illustrated embodiment, the processor 112 may include a stream detector 103. In various embodiments, the stream detector 103 may be configured to detect when a plurality of store operations constitutes a stream of data store operations, or a series of store operations to a contiguous memory space. In some embodiments, this may include software hints, but, in the illustrated embodiment, the stream detector 103 may be configured to perform hardware detection of a store stream. In various embodiments, the stream detector 103 may be included in the LSU 102.

Figure 2:
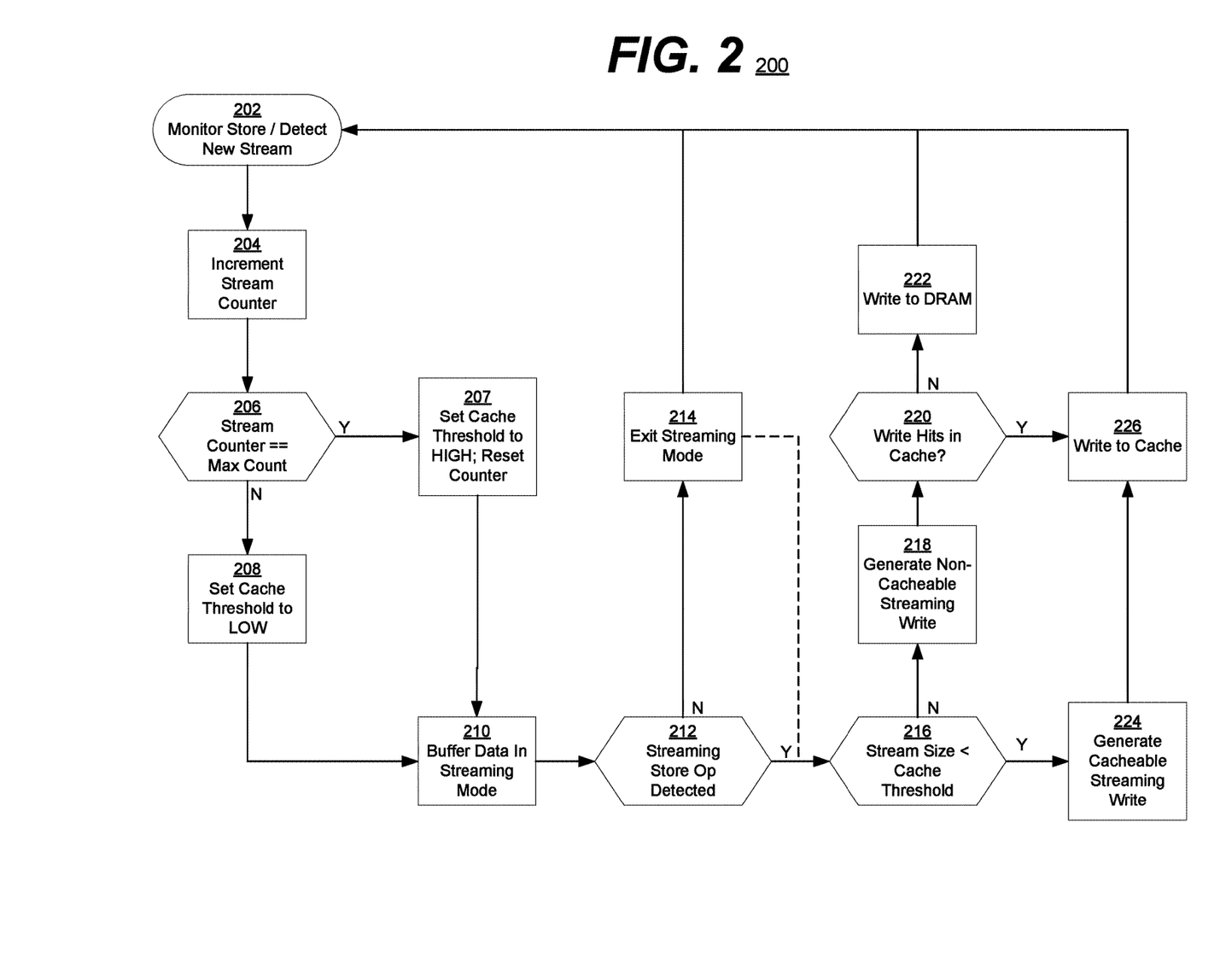
FIG. 2 is a flowchart of an example embodiment of a technique in accordance with the disclosed subject matter.

The disclosed subject matter generally operates within an environment of store streams. Therefore, the operation of the system 100 after the stream detector 103 detects a store stream is discussed in detail. FIG. 2 shows the operation of the system 100 in such a context and the details of the disclosed subject matter will be discussed in relation to that figure. However it may be useful to the reader to identify and introduce the various components of the system 100 before explaining their interaction.

In some embodiments, the processor 112 may include stream buffer 104 configured to temporarily buffer or store a series of relatively small pieces of a data stream. Eventually, these relatively small pieces of the data stream may be concatenated to form a more efficient portion of the data stream that is then stored in the memory system.

In the illustrated embodiment, the processor 112 may include a write generator 108. In such an embodiment, the write generator 108 may be configured to write data from the stream buffer 104 to the memory system 150 (e.g., system memory 116, L2 cache 114, etc.). As described below, the write generator 108 may be configured to dynamically determine the target tier of the memory system for the write operation based upon the size of the stream and/or the cache threshold 107.

In the illustrated embodiment, the processor 112 may include a stream counter 106. In such an embodiment, the stream counter 106 may be configured to indicate and track the number of streams detected by the stream detector 103. In one illustrative embodiment, the stream counter 106 may include a 4-bit counter. In some embodiments, the stream counter 106 may include a barrel or roll-over counter, such that when the highest counter value is reached (i.e., the stream counter 106 saturates) the next increment of the counter may cause the counter to roll-over to the lowest value. For example, the 4-bit counter may increment from a value of 15 to 0. In various embodiments, the stream counter 106 may increment by values of 1; although, it is understood that the above is merely one illustrative example to which the disclosed subject matter is not limited. In various embodiments, the stream counter 106 may decrement instead of increment. In another embodiment, the stream counter 106 may both decrement and increment according to the embodiment. It is understood that the above are merely a few illustrative examples to which the disclosed subject matter is not limited.

In various embodiments, the processor 112 may include a cache threshold value or cache size threshold value 107. In various embodiments, the cache threshold 107 may be configured to indicate or limit the size of the data stream that may be stored in a particular tier of the memory system (e.g., the L2 cache 114, etc.). In such an embodiment, the cache threshold 107 may be set to one of a number of predefined values based upon a set of rules, as described below. In such an embodiment, value of the cache threshold 107 may be dynamically varied such that cache pollution by the stream of data is managed.

FIG. 2 is a flowchart of an example embodiment of a technique 200 in accordance with the disclosed subject matter. In the illustrated embodiment, the technique 200 will be described in relation to the components of system 100 of FIG. 1. However, it is understood that the above is merely one illustrative example to which the disclosed subject matter is not limited. In various embodiments, the technique 200 may be used or produced by the systems such as those of FIGS. 1, 3, 4, or 5. It is understood that the disclosed subject matter is not limited to the ordering of or number of actions illustrated by technique 200.

Block 202 illustrates that, in one embodiment, store operations may be monitored and, eventually, a new store stream may be detected. As described above, in various embodiments, the detection may occur via a software encoded hint. However, in the illustrated embodiment, hardware detection may be employed. In various embodiments, one or more of the action(s) illustrated by this Block may be performed by the apparatuses or systems of FIGS. 1, 3, 4, or 5, the stream detector of FIGS. 1, 3, or 4, as described above.

Block 204 illustrates that, in one embodiment, the stream counter may be incremented to indicate that a new stream of data has been encountered, as described above. In various embodiments, one or more of the action(s) illustrated by this Block may be performed by the apparatuses or systems of FIGS. 1, 3, 4, or 5, the stream counter of FIGS. 1, 3, or 4, as described above.

Block 206 illustrates that, in one embodiment, a value for the cache threshold may be determined based upon a set of rules. In the illustrated embodiment, the set of rules may simply be that the stream counter has saturated or otherwise reached a predetermined value (e.g., the maximum count, greater than a counter threshold value, etc.). In various embodiments, one or more of the action(s) illustrated by this Block may be performed by the apparatuses or systems of FIGS. 1, 3, 4, or 5, the stream counter or load/store unit of FIGS. 1, 3, or 4, as described above.

Blocks 207 and 208 illustrates that, in one embodiment, the cache threshold may be set to one of at least two predefined values, depending upon the value of the stream counter and the set of rules governing the meaning of that value. In one embodiment (illustrated by Block 207), the cache threshold may be set to a high value. In another embodiment (illustrated by Block 208), the cache threshold may be set to a low value. As described below, the cache threshold may indicate how much of the data stream may be cached or stored in the near memory before it is to be stored in the far memory.

In such an embodiment, the amount of cache pollution may be managed by limiting the amount of data to be stored in the local or nearer cache or memory. In such an embodiment, large data streams may not be allowed to dominate or monopolize a local cache, driving out any other potential non-streamed data. However, if a data stream is determined to be likely to be re-used or accessed from the cache, the cache threshold may be increased to allow more of the data stream to be local cached. In such an embodiment, the set of rules (Block 206) may be important in predicting which data streams may be temporally accessed. In various embodiments, the majority of streams may be assigned a lower cache threshold value, while a minority of streams may be assigned a higher cache threshold value.

In one embodiment, the stream counter may include a width of 4-bits and the set of rules may dictate that when the stream counter saturates or is equal to a maximum value (e.g., 15) or exceeds a stream counter threshold value, the cache threshold may be set to a high value. Otherwise, in this embodiment, the cache threshold may be set to a low value. In one such embodiment, the high value may be equal to 256 kilobytes (KBs) and the low value may be equal to 1 KB. It is understood that the above are merely a few illustrative examples to which the disclosed subject matter is not limited. In various embodiments, one or more of the action(s) illustrated by this Block may be performed by the apparatuses or systems of FIGS. 1, 3, 4, or 5, the stream counter, load/store unit, and/or cache threshold of FIGS. 1, 3, or 4, as described above.

Block 210 illustrates that, in one embodiment, the data of the store stream may be temporarily buffered, as described above. In various embodiments, this may be referred to as "streaming mode". In various embodiments, one or more of the action(s) illustrated by this Block may be performed by the apparatuses or systems of FIGS. 1, 3, 4, or 5, the stream buffer of FIGS. 1, 3, or 4, as described above.

Block 212 illustrates that, in one embodiment, as new store operations are issued (e.g., by the load/store unit, etc.), they may be monitored to determine if the store operation is part of the current store stream. In various embodiments, an unrelated store operation may occur (e.g., to a completely different memory location, etc.). In such an embodiment, the occurrence of such an unrelated operation may indicate that the current store stream is over. In various embodiments, one or more of the action(s) illustrated by this Block may be performed by the apparatuses or systems of FIGS. 1, 3, 4, or 5, the stream detector and/or the load/store unit of FIGS. 1, 3, or 4, as described above.

Block 214 illustrates that, in one embodiment, if a non-streaming store operation is detected, the system may exit streaming mode. In one embodiment, the system may return to Block 202 where it monitors store operations and attempts to detect a new store stream, as described above. In such an embodiment, part of exiting streaming mode may include writing the buffered data to the appropriate memory and flushing the stream buffer, as described below.

Block 216 illustrates that, in one embodiment, a determination may be made as to which tier of the memory system the stream is to be stored. In the illustrated embodiment, the determination may be based upon the size of the store stream compared to the cache threshold. In some embodiments, a multiple threshold levels may be employed to route the store stream to one of a plurality of memory tiers, although only two tiers are shown in FIG. 2. In various embodiments, one or more of the action(s) illustrated by this Block may be performed by the apparatuses or systems of FIGS. 1, 3, 4, or 5, the write generator and/or the load/store unit of FIGS. 1, 3, or 4, as described above.

Block 218 illustrates that, in one embodiment, if the size of the store stream is greater than or equal to the cache threshold, a non-cacheable streaming write may be generated. In this context, a "non-cacheable streaming write" may include a streaming write intended to be stored to a far tier of the memory system. But if there's an existing copy of the line in the cache, the new streaming write overwrites the existing copy. In various embodiments, the non-cacheable streaming write may be stored in a far tier of the memory system (e.g., DRAM, etc.). In such an embodiment, the stream may not pollute the nearer caches. In such an embodiment, the stream may have been predicted as one that is unlikely to be accessed in the near future. Therefore, its caching in a nearer tier of the memory system may not be advantageous. In various embodiments, one or more of the action(s) illustrated by this Block may be performed by the apparatuses or systems of FIGS. 1, 3, 4, or 5, the write generator of FIGS. 1, 3, or 4, as described above.

Block 220 illustrates that, in one embodiment, the system may be configured to check, before writing the data to the far memory tier, whether the data is already stored in a nearer memory tier (e.g., the L2 cache, etc.). In such an embodiment, the write may cause a "hit" on the nearer cache. In the illustrated embodiment, if such a hit occurs, the stream may be written to the nearer cache even if it was originally targeted for the far memory tier. In another embodiment, the data in the nearer cache may simply be marked as invalid and the write may still occur to the farther memory tier. In yet another embodiment, another form of cache coherence and amelioration may be practiced. In various embodiments with a memory system that includes a number of intermediate memory tiers, a hit may occur in any of a number of tiers and the write may be re-routed appropriately. It is understood that the above are merely a few illustrative examples to which the disclosed subject matter is not limited.

Block 222 illustrates that, in one embodiment, the stream may be stored in the farther memory tier. In the illustrated embodiment, the farther memory tier includes a DRAM or system-level memory. It is understood that the above is merely one illustrative example to which the disclosed subject matter is not limited.

Block 224 illustrates that, in one embodiment, if the size of the store stream is less than the cache threshold, a cacheable streaming write may be generated. In various embodiments, the cacheable streaming write may be stored in a near tier of the memory system (e.g., the L2 cache, etc.). In such an embodiment, the stream may have been predicted as one that is likely to be accessed in the near future and therefore its storage in the near cache would not be considered pollution. Therefore, its caching in a nearer tier of the memory system may be advantageous. It is understood that the above is merely one illustrative example to which the disclosed subject matter is not limited. In various embodiments, one or more of the action(s) illustrated by this Block may be performed by the apparatuses or systems of FIGS. 1, 3, 4, or 5, the write generator of FIGS. 1, 3, or 4, as described above.

Block 226 illustrates that, in one embodiment, the stream may be stored in the near memory tier (e.g., the L2 cache, etc.). It is understood that the above is merely one illustrative example to which the disclosed subject matter is not limited.

Figure 3:
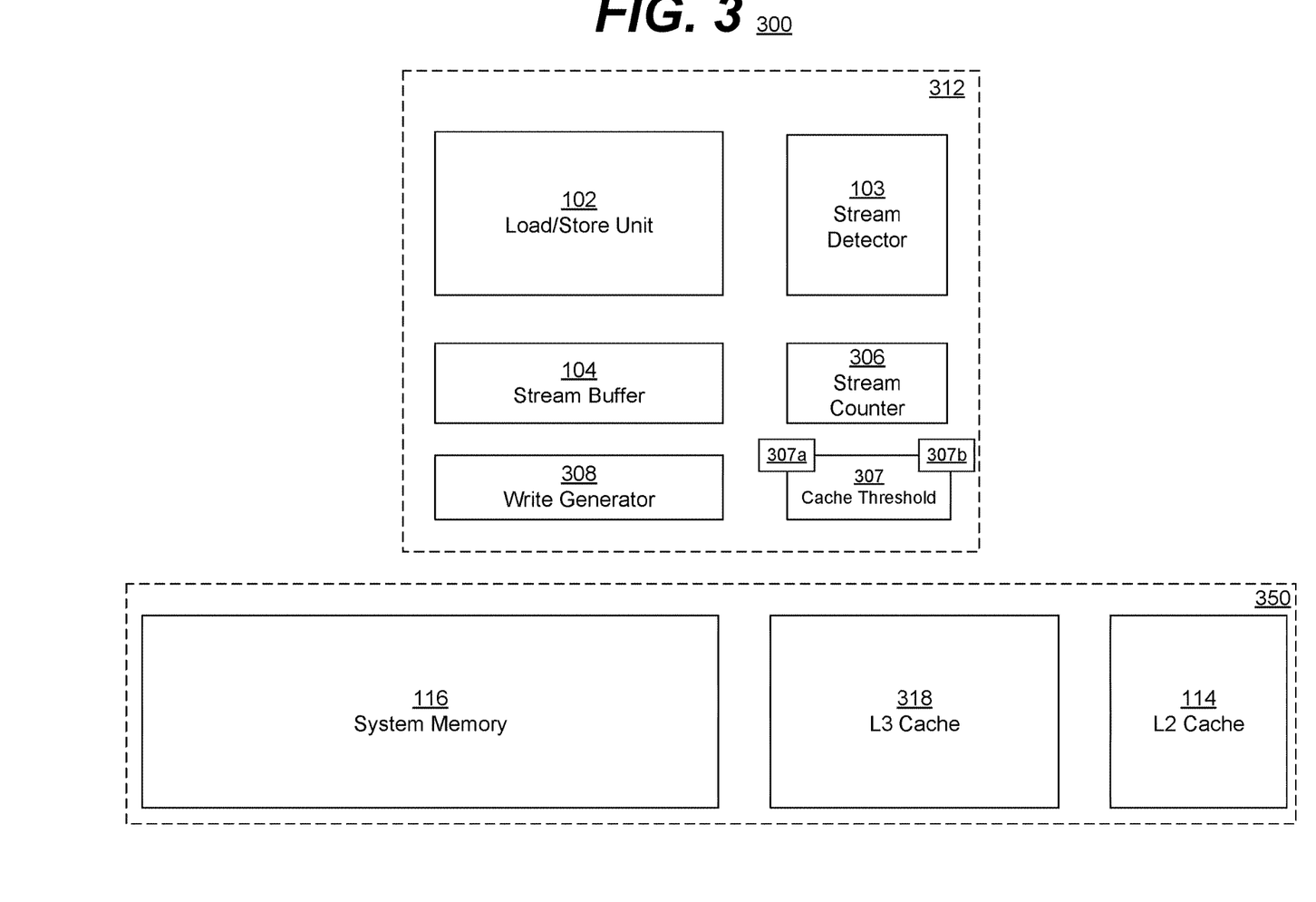
FIG. 3 is a block diagram of an example embodiment of a system in accordance with the disclosed subject matter.

FIG. 3 is a block diagram of an example embodiment of a system 300 in accordance with the disclosed subject matter. In the illustrated embodiment, the system 300 may include a include a computing device, such as, for example, a laptop, desktop, workstation, personal digital assistant, smartphone, tablet, and other appropriate computers.

In the illustrated embodiment, the system 300 may include a memory system 350 with at least three tiers. In the illustrated embodiment, the memory system 350 may include the system memory 116, the L3 cache 318, and the L2 cache 114. In such an embodiment, the system memory 116 may be the tier furthest (topologically) from the processor 312. The L2 cache 114 may be the tier closest or nearest to the processor 312. And, the L3 cache 318 may be in between the other two memories. It is understood that the above is merely one illustrative example to which the disclosed subject matter is not limited.

In the illustrated embodiment, the processor 312 may include a load/store unit 102, a stream detector 103, and a stream buffer 104, as described above. In the illustrated embodiment, the processor 312 may also include a stream counter 306, cache threshold 307 and a write generator 308 each configured to allocate or route streams to more than two tiers of a memory system.

In such an embodiment, the stream counter 306 may be associated with a set of rules that dictate multiple possible cache threshold 307 values. For example, the set of rules may identify data streams with one of three levels of confidence. Streams that are viewed as having little chance of being accessed relatively quickly may be assigned a low cache threshold value 307. Whereas streams that are viewed as having a high chance of being accessed relatively quickly may be assigned a high cache threshold value 307. And stream that are viewed as having a medium chance of being accessed relatively quickly may be assigned a medium cache threshold value 307.

In yet another embodiment, the cache threshold 307 may include two thresholds 307a and 307b. In such an embodiment, a first thresholds 307a may delineate between the far memory tier and the medium memory tier, and a second thresholds 307b may delineate between the medium memory tier and the near memory tier. In such an embodiment, the values assigned to these two thresholds 307a and 307b may be increased or decreased according to the value of the stream counter 306 and the set of rules. In another embodiment, other cache threshold values 307 schemes may be employed. It is understood that the above are merely a few illustrative examples to which the disclosed subject matter is not limited.

Likewise, in such an embodiment, the write generator 308 may be configured to route the data stream to one of the three memory tiers (e.g., system memory 116, L3 cache, L2 cache, etc.). Returning to the second prior illustrative example, if the size of the stream is less than the second cache threshold value 307b, the stream may be written to the nearest tier or L2 cache 114. If the size of the stream is between the first cache threshold value 307a and the second cache threshold value 307b, the stream may be written to the middle tier or L3 cache 318. And, if the size of the stream is greater than the first cache threshold value 307a, the stream may be written to the farthest tier or system memory 116. It is understood that the above is merely one illustrative example to which the disclosed subject matter is not limited. In various embodiments, memory systems 350 with more than three tiers of caching may be employed.

Figure 4:
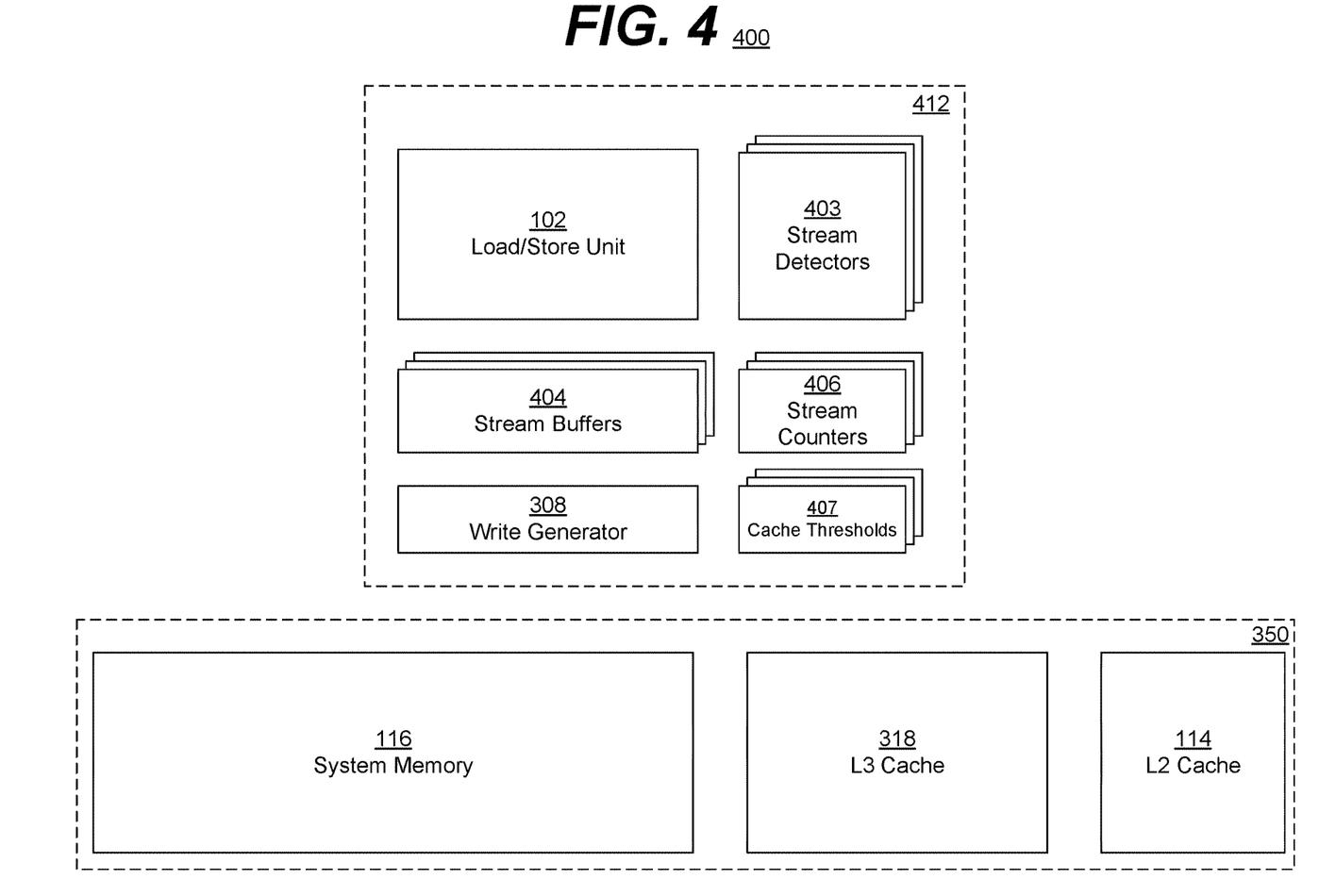
FIG. 4 is a block diagram of an example embodiment of a system in accordance with the disclosed subject matter.

FIG. 4 is a block diagram of an example embodiment of a system 400 in accordance with the disclosed subject matter. In the illustrated embodiment, the system 400 may include a include a computing device, such as, for example, a laptop, desktop, workstation, personal digital assistant, smartphone, tablet, and other appropriate computers.

In the illustrated embodiment, the system 400 may include a memory system 350 with at least two tiers. In the illustrated embodiment, the memory system 350 may include the system memory 116, the L3 cache 318, and the L2 cache 114. In another embodiment, the memory system 350 may only include the system memory 116 and L2 cache 114, such as shown in FIG. 1. It is understood that the above are merely a few illustrative examples to which the disclosed subject matter is not limited.

In the illustrated embodiment, the processor 412 may include a load/store unit 102, and a write generator 308, as described above. In the illustrated embodiment, the processor 412 may include at least one of stream detector 403, a plurality of stream buffers 404, at least one stream counter 406, and a plurality of cache thresholds 407. In such an embodiment, each of the stream detectors 403, stream buffers 404, stream counters 406, and cache thresholds 407 may be configured to process or perform an embodiment of the technique illustrated in FIG. 2 on a separate respective store stream. In such an embodiment, the processor 412 may simultaneously or nearly simultaneously processes multiple store streams of data.

In such an embodiment, the stream counter 406 may assign a cache threshold 407 to each detected stream. In such an embodiment, each stream may be associated with separate cache threshold value. Some streams may be associated with a low threshold value, whereas other streams may be associated with a higher threshold value. In such an embodiment, when the write generator 308 routes a respective data stream to a particular tier of the memory system 350, it may access the cache threshold 407 associated with the respective stream and compare the size of the stream to the respective cache threshold value. It is understood that the above are merely a few illustrative examples to which the disclosed subject matter is not limited.

Figure 5:
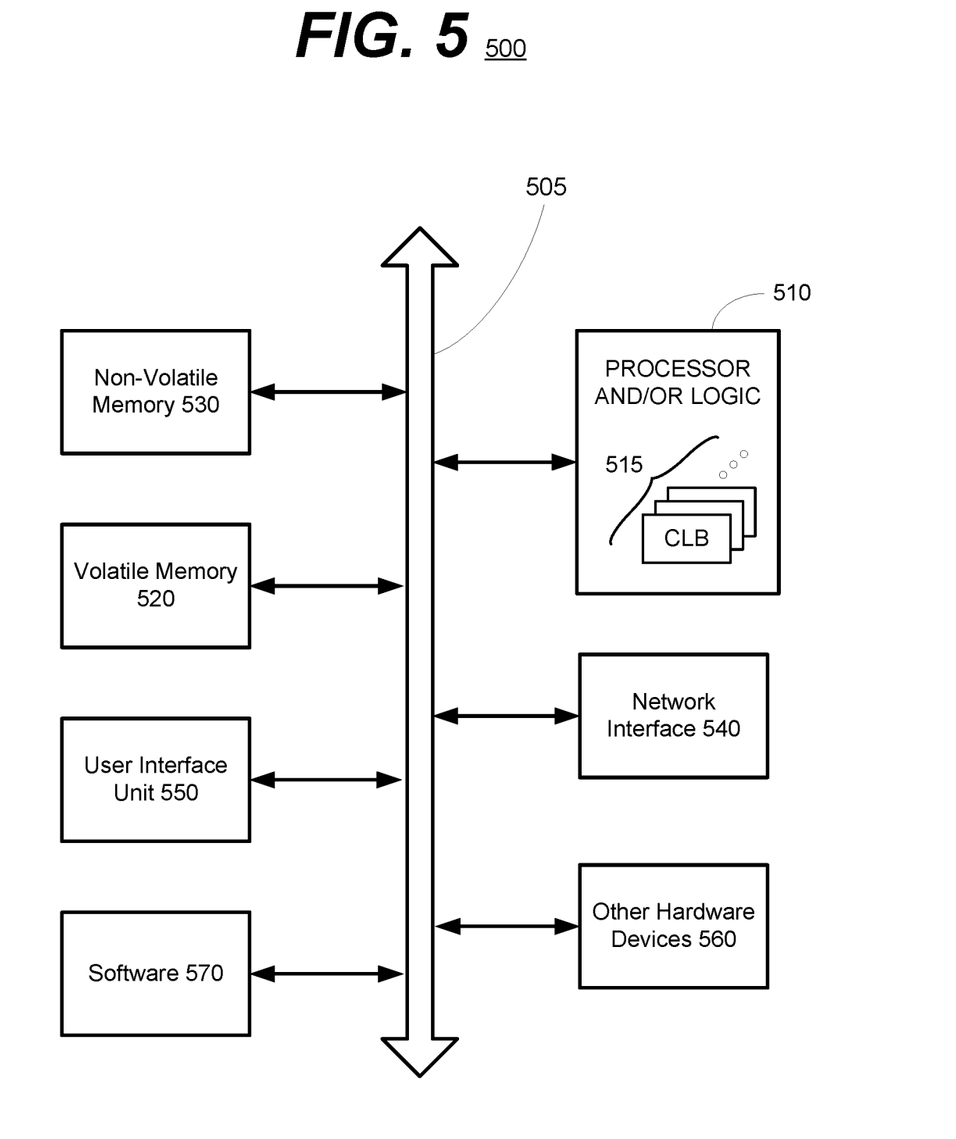
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM), etc.). The information processing system 500 according to the disclosed subject matter may further include a non-volatile memory 530 (e.g., a hard drive, an optical memory, a NAND or Flash memory, etc.). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11 g, IEEE 802.11 n, etc. Examples of a cellular protocol may include, but are not limited to: IEEE 802.16 m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 500 according to the disclosed subject matter may further include a user interface unit 550 (e.g., a display adapter, a haptic interface, a human interface device, etc.). In various embodiments, this user interface unit 550 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor, etc.). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540, etc.) of the information processing system 500. In such an embodiment, the information processing system 500 may include one or more native applications, which may be installed locally (e.g., within the non-volatile memory 530, etc.) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A method, comprising:
   detecting a stream of data to be written to a memory system having a first cache tier and a second cache tier;
   writing the stream of data to either the first cache tier of the memory system or the second cache tier of the memory system based upon a cache threshold value, the cache threshold value comprising a size limit of data of the stream of data that may be stored in the first cache tier; and
   dynamically varying the cache threshold value based upon a predetermined rule set, such that cache pollution within the first cache tier and the second cache tier caused by the stream of data is managed, wherein the predetermined rule set comprises:
   setting the cache threshold value to a low value for a majority of streams of data, and
   setting the cache threshold value to a high value for a minority of streams of data.

2. The method of claim 1, wherein dynamically varying the cache threshold value includes:
   detecting a stream of data to be written to the memory system;
   incrementing a value of a stream counter; and
   setting the cache threshold value to one a plurality of predefined values based upon the value of the stream counter.

3. The method of claim 1,
   wherein writing the stream of data to either a first memory of the memory system or a second memory of the memory system includes:
      writing the stream of data to the first cache tier of the memory system based on a size of the stream of data being less than the cache threshold value, and
      writing the stream of data to the second cache tier of the memory system based on a size of the stream of data being greater than the cache threshold value.

4. The method of claim 3, wherein dynamically varying the cache threshold value includes:
   detecting a stream of data to be written to the memory system;
   incrementing a value of a stream counter; and
   setting the cache threshold value to a low value based on the stream counter not having reached a counter threshold value, and
   setting the cache threshold value to a high value based on the stream counter having reached a counter threshold value.

5. The method of claim 4, wherein the low value of the cache threshold value is one kilobyte, and
   wherein the high value of the cache threshold value is 256 kilobytes.

6. The method of claim 1, wherein writing the stream of data to the second cache tier of the memory system includes:
   determining that the stream of data is already stored in the first cache tier of the memory system; and
   also writing the stream of data to the first cache tier of the memory system.

7. The method of claim 1, wherein writing the stream of data to either a first cache tier of the memory system or a second cache tier of the memory system based upon the cache threshold value includes:
   writing the stream of data to a selected tier or at least three tiers of the memory system, wherein the selected tier is selected based a speed of the tier in the memory system and the cache threshold value; and
   wherein the dynamically varying the cache threshold value based upon a predetermined rule set, such that larger streams of data are stored in further tiers of the memory system.

8. The method of claim 1, wherein detecting a stream of data to be written to a memory system includes detecting a plurality of streams of data to be written to a memory system;
   wherein dynamically varying the cache threshold value based upon a predetermined rule set, such that cache pollution caused by the stream of data is managed includes maintaining a plurality of cache threshold values, wherein each cache threshold value is associated with a respective stream of data; and
   wherein writing the stream of data includes, when a size of a respective stream of data exceeds a corresponding cache threshold value, writing the stream of data to a selected tier of the memory system based upon the corresponding cache threshold value.

9. The method of claim 1, wherein dynamically varying the cache threshold value based upon a predetermined rule set includes attempting to store streams of data that will be temporally accessed in the first cache tier of the memory system.

10. An apparatus, comprising:
    a store stream detector configured to detect when the apparatus is streaming data to a memory system;
    a write generator configured to route a stream of data to either a first memory of the memory system or a second memory of the memory system based upon a cache threshold value and a size of the stream of data; and
    wherein the apparatus is configured to dynamically vary the cache threshold value based upon a predetermined rule set, such that cache pollution caused by the stream of data is managed, wherein dynamically varying the cache threshold value includes:
    setting the cache threshold value to a low value for a majority of streams of data, and
    setting the cache threshold value to a high value for a minority of streams of data.

11. The apparatus of claim 10, further comprising:
    a stream counter configured to increment a stream counter value when a new stream of data is detected by the store stream detector; and
    a cache threshold memory configured to store the cache threshold value, wherein the cache threshold value is set, when a new stream of data is detected by the store stream detector, to one a plurality of predefined values based upon the stream counter value.

12. The apparatus of claim 10,
    wherein the write generate is configured to:
    write the stream of data to the first memory of the memory system based on a size of the stream of data being less than the cache threshold value, and
    write the stream of data to the second memory of the memory system based on the size of the stream of data being greater than the cache threshold value.

13. The apparatus of claim 12, wherein the load/store unit is configured to:
    set the cache threshold value to a low value based on a stream counter not having reached a counter threshold value, and
    set the cache threshold value to a high value based on the stream counter having reached a counter threshold value.

14. The apparatus of claim 13, wherein the low value of the cache threshold value is one kilobyte, and
wherein the high value of the cache threshold value is 256 kilobytes.

15. The apparatus of claim 10, wherein the write generator is configured to:
determine whether the stream of data is already stored in the first memory of the memory system; and
write the stream of data to the first memory of the memory system based on the stream of data being already stored in the first memory of the memory system.

16. The apparatus of claim 10, wherein the write generator is configured to:
write the stream of data to a selected tier or at least three tiers of the memory system, wherein the selected tier is selected based a speed of the tier in the memory system and the cache threshold value.

17. The apparatus of claim 10, wherein the apparatus is configured to:
maintain a plurality of cache threshold values, wherein each cache threshold value is associated with a respective stream of data; and
wherein the write generator is configured to write the stream of data to a selected tier of the memory system based upon a respective cache threshold value.

18. A system-on-a-chip comprising:
a memory system comprising:
a first memory configured to store data, and
a second memory configured to store data, wherein the second memory is slower and larger than the first memory; and
a processor comprising:
a store stream detector configured to detect when a stream of data is being written to the memory system, and
a write generator configured to route the stream of data to either the first memory or the second memory based upon a cache threshold value and a size of the stream of data, the cache threshold value comprising a size limit of data of the stream of data that may be stored in the first memory, and
wherein the processor is configured to dynamically vary the cache threshold value based upon a predetermined rule set, such that cache pollution caused by the stream of data is managed, and to maintain a plurality of cache threshold values, wherein each cache threshold value is associated with a respective stream of data.

19. The system-on-a-chip of claim 18, wherein the processor further comprises:
a stream counter configured to increment a stream counter value when a new stream of data is detected by the store stream detector,
a cache threshold memory configured to store the cache threshold value, and
a load/store unit configured to, when a new stream of data is detected by the store stream detector:
set the cache threshold value to a low value for a majority of streams of data, and
set the cache threshold value to a high value for a minority of streams of data; and
wherein the write generator is configured to:
write the new stream of data to the first memory based on a size of the new stream of data being less than the cache threshold value, and
write the new stream of data to the second memory based on the size of the new stream of data being greater than the cache threshold value.

20. The system-on-a-chip of claim 18, wherein
the write generator is configured to write the stream of data to a selected tier of the memory system based upon a corresponding cache threshold value.

* * * * *